Figure 1:
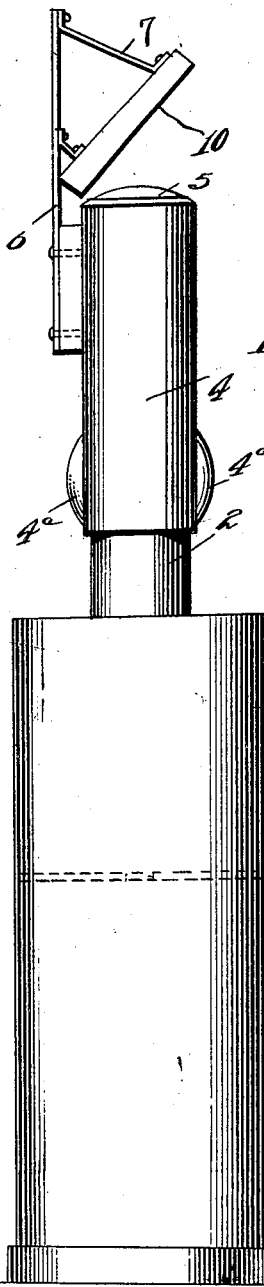

Aug. 4, 1931.  J. R. BUELOW  1,817,734
MIRROR FOR RETINOSCOPES
Filed May 1, 1928

INVENTOR
J. R. Buelow
BY
ATTORNEY

Patented Aug. 4, 1931

1,817,734

UNITED STATES PATENT OFFICE

JOHN RICHARD BUELOW, OF WINSLOW, ILLINOIS

MIRROR FOR RETINOSCOPES

Application filed May 1, 1928. Serial No. 274,291.

This invention relates to mirrors for retinoscopes.

Ordinarily in retinoscopy a beam of light is directed into the patient's eye, and the operator watches the movement of the edge of the shadow as the mirror is tilted in different meridians, the nature and direction of the shadow movement determining the nature of refraction. It has, however, been found that a beam of light brought to a focus on the retina is much easier to see than a shadow and with a mirror having the property of bringing a perfectly round spot of light source to a perfect round image on the retina, of a normal eye, the oculist can instantly judge the nature of refraction by the shape of the image. For instance, if astigmatism is present the image will be oval in form instead of round, in the low errors and gradually as the error reaches a higher value, the image amounts to a narrow streak of light across the pupil. The error is then corrected by interposing cylinders till this streak or oval is a perfectly round spot. The spherical error is then corrected in the usual way.

The ordinary mirror in general use cannot be used for this purpose, since the doubling of images formed on the retina somewhat resembles the condition of a low error of astigmatism. Hence, it is obvious that the nearer to perfection of the image delivered by the mirror the more precision is obtained in the resulting diagnosis and finally the prescription for a correcting lens.

A primary object of this invention is to provide a mirror so constructed that it will deliver a perfected image and thus overcome the objections above noted.

Another object of the invention is to provide a prismatic mirror for use in connection with retinoscopes whereby the secondary or faint first surface images are directed away from the eye under observation sufficiently so that they will not enter the pupil to be focused on the retina and only perfect image will be seen by the observating eye, thus rendering it much easier to judge the nature of the error of the eye under examination.

Figure 2:
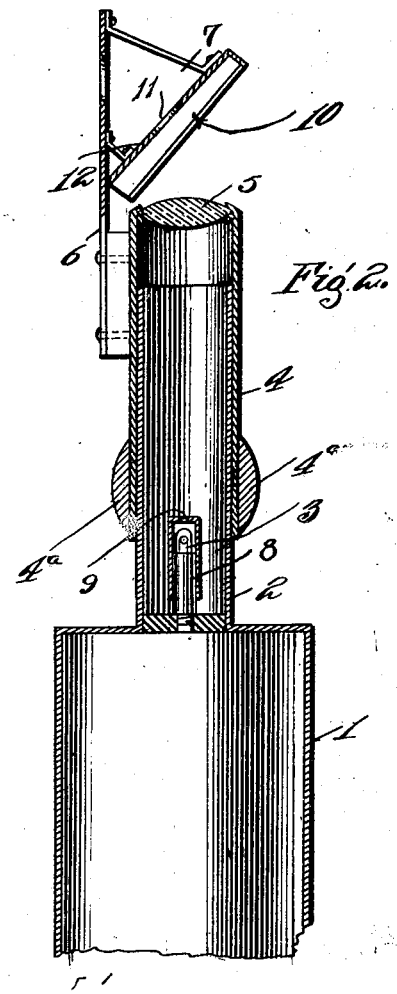
Figure 3:
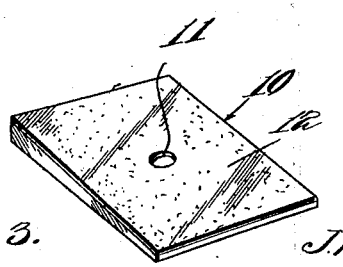

In carrying out these objects, the invention is susceptible of a wide range of modification without departing from the spirit or sacrificing any of the advantages of the claimed invention there being shown in the drawings for illustrative purposes a preferred and practical form in which;

Figure 1 represents a side elevation of a retinoscope equipped with this improved mirror, Fig. 2 is a longitudinal vertical section thereof with part of the battery handle or container broken off, and Fig. 3 is a perspective view of the mirror constituting the invention, shown detached.

In the embodiment illustrated, a battery handle 1 is shown of the flashlight type for supplying current to the bulb 3 which constitutes the source of light used in the retinoscope. This bulb 3 is shown mounted in a sleeve-like extension 2 carried by one end of the member 1 and over which is telescopically engaged another sleeve or shell 4 which carries the condensing lens 5 at its upper end. A knurled rib $4^a$ encircles shell 4 to facilitate the manipulation of the shell. A metal cap 8 slides over the light bulb 3 and excludes all light except that which passes through the aperture 9 in the cap to the condensing lens 5 and which is deflected by the mirror 10 to the eye.

A longitudinally extending bracket 6 is mounted on the sleeve 4 at one side thereof and projects beyond the lens carrying end and has mounted thereon the mirror 10 which is designed for bringing to a focus on the retina a beam of light to enable the oculist to judge the nature of the refraction. The focusing is accomplished by sliding the tube 4 and with it the lens 5 and mirror 10, up and down on the tube. This mirror 10 is ground prismatic or with the two surfaces at a slightly different angle relative to each other instead of with both sides parallel as is usual in mirrors of this character. The parallel mirror has two reflecting surfaces, first the silver backing and second the first surface of the glass itself causing instead of a perfect image of the source of light, a double or triple image. By grinding the mirror prismatic as shown in the drawings the secondary or faint first surface images are directed away from the eye under observation so that they will not enter the pupil to be focused on the retina and only the perfect image will be seen by the observing eye, thus rendering it much easier to judge the nature of the error of the eye under examination.

The difference in angle of the two surfaces is not important within certain limits, one degree being about the proper amount.

The prismatic mirror 10 has a reflecting backing 12 on one face thereof, a peephole 11 being formed in said reflecting backing and the body of the mirror made prismatic so as to divert the image reflected by the first surface of said mirror from the path of the image reflected from the second surface, so that the image from the first surface cannot enter the pupil of the observed eye when the image of the second surface is directed into said pupil.

Moreover, the telescopic mounting of the sleeve 4 on the sleeve 2 operates to permit adjustment of the mirror with the lens to and from the light source here shown in the form of an electric light bulb 3.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A mirror for retinoscopes and the like consisting of a comparatively flat transparent body having a reflecting material on one face with a peephole through said material, the other face of said mirror being arranged to form a prism to divert the image reflected by one face from the path of the image reflected by the other face of the mirror so that the image from the first surface cannot enter the pupil of the observed eye when the image of the second surface is directed into the pupil of the eye under examination.

2. The combination with a battery handle having a light bulb; a condensing lens movable toward and away from said light bulb, a mirror movable with said lens and having a reflecting material on one face and the other face ground at an angle to the reflecting face so that the first surface reflection will be diverted from the path of the image reflected by the second surface, said surfaces maintaining at all times their relative positions thereby ensuring a single image being focused in the retina of the patient's eye.

3. A mirror for retinoscopes made in the form of a single prism and having a reflecting material on one face, said reflecting material having a peephole therein.

J. RICHARD BUELOW.